United States Patent [19]
Arora

[11] 3,965,029
[45] June 22, 1976

[54] LIQUID CRYSTAL MATERIALS
[75] Inventor: Sardari L. Arora, Kent, Ohio
[73] Assignee: Kent State University, Kent, Ohio
[22] Filed: Feb. 4, 1974
[21] Appl. No.: 439,046

[52] U.S. Cl............................... 252/299; 350/150; 350/160 LC; 428/1
[51] Int. Cl.² ...................... C09K 3/34; G02F 1/13
[58] Field of Search.................... 252/299, 408 LC; 350/160 LC, 150; 428/1

[56] References Cited
UNITED STATES PATENTS

| | | | |
|---|---|---|---|
| 3,655,270 | 4/1972 | Creagh | 252/299 |
| 3,675,987 | 7/1972 | Rafuse | 252/299 |
| 3,690,745 | 9/1972 | Jones | 252/299 |
| 3,731,986 | 5/1973 | Fergason | 350/160 LC |
| 3,756,694 | 9/1973 | Soree et al. | 252/408 LC |
| 3,826,757 | 7/1974 | Wong | 252/408 LC |
| 3,838,059 | 9/1974 | Wong | 252/299 |

OTHER PUBLICATIONS

Creagh, L. T. Proc. IEEE, vol. 61, No. 7, pp. 814–821, (July 1973).
Arora, S. L., Fergason, J. L., & Saupe, A., *Mol. Crys. Liq. Crys.*, vol. 10, pp. 243–257 (1970).
Kast, Landolt–Börnstein, vol. 2, part 2(*a*) Springer–Verlag, Berlin, 6th Edition, pp. 266–267, 309–310 (1960).

*Primary Examiner*—Benjamin R. Padgett
*Assistant Examiner*—T. S. Gron

[57] ABSTRACT

Disclosed are alkoxybenzalmethylphenylenediamines and methylbenzalbutylaniline as liquid crystal materials, and eutectic mixtures of these as long life liquid crystal materials.

6 Claims, No Drawings

LIQUID CRYSTAL MATERIALS

Liquid crystal materials of the nematic type appear to fail as a consequence of both a breakdown of ionic impurities within the system and the decomposition of the liquid crystal material itself. It was found, for example, that in 2-chloro-1,4-phenylenediamine derivatives, the chloro substituent was responsible for much decomposition.

It is an object of this invention to provide new long life liquid crystal materials.

It is a further object of this invention to provide new long life liquid crystal materials capable of operating at room temperatures.

It is a further object of this invention to provide a method for rendering liquid crystal materials having high transition temperatures operable at lower temperatures.

We have improved the operation of liquid crystal materials by synthesizing derivatives of 2-methyl-1, 4-phenylenediamines, more particularly alkoxybenzal-2-methyl-1, 4-phenylenediamines, and mixing them with an alkylbenzalbutylaniline.

The alkoxybenzal-2-methyl-1,4-phenylenediamines were prepared by the condensation of 2-methyl-1,4-phenylenediamine with p-n-alkoxybenzaldehydes.

2-methyl-1,4-phenylenediamine was prepared as a free base by first neutralizing commercially available 2-methyl-1, 4-phenylenediamine sulphate in its aqueous solution. The aqueous solution was extracted with benzene and ether, and after dehydration, filtration and removal of excess solvents, the residual liquid on cooling gave a solid with a melting point of 63°–64°C.

Alkoxybenzaldehydes were prepared by dissolving p-hydroxybenzaldehyde in 10 percent aqueous KOH (1 mol) solution with subsequent evaporation to near dryness. The product was finally powdered and dried in a vacuum desicator. The potassium salt of the benzaldehyde was refluxed with an appropriate n-bromoalkane (1.4 mol) in absolute alcohol for about twelve hours. After the removal of alcohol, water was added and the separated oily liquid was extracted with ether. After dehydration and removal of ether, the residual liquid was distilled under reduced pressure and 4-alkoxybenzaldehydes were obtained in good yields.

The preferred alkoxybenzal-2-methyl-1,4-phenylenediamines are the Bis(4'-n-alkoxybenzal)-2-methyl-1,4-phenylenediamines, which were prepared by refluxing 2-methyl-1,4-phenylenediamine (1 mol) with the appropriate alkoxybenzaldehyde (2 mol) in absolute alcohol for 5 to 6 hours. After isolation, the product was recrystalized several times from appropriate solvents until the transition temperatures remained constant. The yields were approximately 85–90 percent.

The following table illustrates the transition temperatures for liquid crystal materials prepared in the manner described in the preceding paragraphs:

Bis-(4'-n-alkoxybenzal)-2-methyl-1,4-phenylenediamine

| Alkoxy Substituent | Transition Temperatures (°C) from Solid or Preceding Liquid Crystal State to: | | |
|---|---|---|---|
| | Smectic | Nematic | Isotropic |
| $C_8H_{17}O-$ | — | 82 | 183 |
| $C_9H_{19}O-$ | — | 81.5 | 173.5 |
| $C_{10}H_{21}O-$ | 72 | 75 | 170 |
| $C_{12}H_{25}O-$ | 80 | 113.5 | 159 |

It may be noted from the above transition temperatures that the alkoxybenzalmethylphenylenediamines would not be operable liquid crystal materials at room temperature. We have found that forming eutectic mixtures of at least one these compounds with an alkylbenzalbutylaniline, as demonstrated in the following example, yield liquid crystal materials that are operable at room temperature and that such materials may be fashioned to possess a lifetime longer than any previously reported in the literature. The 4-methylbenzal-4'-n-butylaniline was prepared by the redistillation of the reaction product obtained after the reflux for 5 to 6 hours of commercially available p-n-butylaniline (1 mol) with p-methyl-benzaldehyde (1 mol). The resulting distillate (b.p. 245°C/1 mm.) was obtained in good yield (approximately 95%).

EXAMPLE

Typically, one mole of Bis(4'-octyloxybenzal)-2-methyl-1,4-phenylenediamine prepared according to the above-described procedure, mixed with 5.15 mols of 4-methylbenzal-4'-n-butylaniline, would yield a eutectic mixture with a nematic-isotropic range of 64°–73°C and which even when frozen would remelt to form a liquid crystal at room temperature. Full lifetime studies with the liquid crystal mixture of Bis(4'-octyloxybenzal)-2-methyl-1,4-phenylenediamine indicated that under ordinary operating conditions no breakdown occurred for 7500 hours, which result can be attributed to the liquid crystal material itself on direct current operation.

I claim:

1. A liquid crystal material comprising a mixture of at least one Bis-(4'-n-alkoxybenzal) - 2-methyl-1, 4-phenylenediamine and 4-methylbenzal-4'-n-butylaniline.

2. The liquid crystal material of claim 1 in which the alkoxy is octyloxy.

3. The liquid crystal material of claim 1 in which the alkoxy is nonyloxy.

4. The liquid crystal material of claim 1 in which the alkoxy is decyloxy.

5. The liquid crystal material of claim 1 in which the alkoxy is dodecyloxy.

6. A liquid crystal material comprising a mixture of about one mol Bis-(4'-octyloxybenzal)-2-methyl-1,4-phenylenediamine and about five mols 4-methylbenzal-4'-n-butylaniline.

* * * * *